United States Patent [19]

Schaefers

[11] Patent Number: 4,528,772

[45] Date of Patent: Jul. 16, 1985

[54] TIPPET TUBE AND METHOD FOR CARRYING TIPPET MATERIAL

[75] Inventor: Elvin J. Schaefers, Moline, Ill.

[73] Assignee: Terminal Tactics, Inc., Sauk Rapids, Minn.

[21] Appl. No.: 529,971

[22] Filed: Sep. 7, 1983

[51] Int. Cl.³ .............................................. A01K 97/00
[52] U.S. Cl. ................................ 43/54.1; 206/315.11; 43/57.1
[58] Field of Search ........................ 43/54.1, 57.1, 57.2, 43/57.3; 224/182, 920, 224, 251; 206/315.11

[56] References Cited

U.S. PATENT DOCUMENTS

| | | | |
|---|---|---|---|
| 1,550,790 | 8/1925 | Dumouchel | 43/57.1 |
| 1,900,035 | 3/1933 | Beck | 43/57.1 |
| 2,233,157 | 2/1941 | Cahn . | |
| 2,525,057 | 10/1950 | Anderson | 43/57.1 |
| 2,657,497 | 11/1953 | Beaver | 43/57.1 |
| 2,785,869 | 3/1957 | Howard, Sr. et al. . | |
| 2,834,144 | 5/1958 | Jones . | |
| 3,388,790 | 6/1968 | Slomczewski | 43/57.1 |
| 3,803,742 | 4/1974 | Foster . | |
| 3,897,650 | 8/1975 | Pilston | 43/54.1 |
| 4,030,228 | 6/1977 | Schaefers . | |
| 4,290,223 | 9/1981 | Ostenberg et al. . | |
| 4,437,258 | 3/1984 | Allard | 43/57.1 |

OTHER PUBLICATIONS

"The Purist", brochure.
"Fly Floatants, and Leader Sinks", brochure pp. 26 and 27.

Primary Examiner—Nicholas P. Godici
Assistant Examiner—Kurt Rowan
Attorney, Agent, or Firm—Merchant, Gould, Smith, Edell, Welter & Schmidt

[57] ABSTRACT

The present invention relates to a relatively transparent, flexible hollow tube (12) having a plurality of elongated strands of tippet material (14), having a variety of diameters, positioned therein. Each of said strands of tippet material (14) being color coded to provide for ready identification of tippet material diameter. A cylindrical plug (16) is inserted at a first end of the tube (12) to retain the tippet material (14) in the tube (12). A plastic cord (20) and snap (22) are provided for attaching the tippet tube (12) to an item of one's wearing apparel while fishing.

12 Claims, 6 Drawing Figures

TIPPET TUBE AND METHOD FOR CARRYING TIPPET MATERIAL

BACKGROUND OF THE INVENTION

The present invention relates to the art of fly fishing and more particularly to a tippet tube and method for carrying tippet material.

Serious fly fishermen are quite discriminating in their use of flies depending upon the type of fish being sought and the particular conditions which prevail when fishing. For example, fishermen may attempt to match the fly which they will use with the kind of insects which appear to be prevalent at the fishing site. Furthermore, discriminating fishermen are very concerned about fly presentation and accordingly are very discriminating in their use of a particular line and even more so concerned with the terminal end of the line which is tied to the fly. The most discriminating fishermen will utilize a long piece of small diameter tippet material to tie the fly to the leader at the end of the line. The particular leader length and size, tippet size and length, and fly configuration and weight will vary depending on the fishing conditions in an effort to match the leader, tippet and fly to their best complementary physical relationship.

This is a very important consideration, since a fly fisherman does not cast a "fly" but rather casts a line. Accordingly, it is not the weight which is a critical factor, but rather the air resistance of the line. The motion of the fly fisherman's hand and rod is transmitted to and through the line to the terminal end thereof. Therefore, in order to get the proper line response at the terminal end it is important that there be the proper tapering near the terminal end. Proper tapering of the line near its terminal end is accomplished by attachment of a leader of proper length and size to the fly line and attachment of a tippet of proper size and length to the leader so as to effectuate a general tapering of the line. The terminal end of the line for a given fly configuration, typically must be within a given range of sizes in order to assure proper presentation. A given leader and tippet size can usually support and effectively straighten itself for about three sizes of flies. If too small, the terminal end of the line will be too limp and not support the fly. If too large, the terminal end of the line will not properly uncurl.

Typically, the tippet material is tied at one end to the fly and at the other end to the leader by a knot known as a "blood knot" which results in a very smooth strong knot. As a result of the very slight diameter of the tippet material, the presentation of the fly is not interfered with or detracted from by a bulky leader being attached directly thereto. Accordingly, fly presentation in the water is significantly improved.

Since it is rare for a fisherman to know ahead of time the exact fishing conditions, it is usually the case that a combination of varying sizes and lengths of leaders and tippets in conjunction with varying fly sizes and types must be experimented with upon reaching the stream or other body of water in an effort to determine the preferred complement of leader, tippet, and fly. Accordingly, the fisherman may find it necessary to try several different flies and fly sizes perhaps within the same general pattern, before being satisfied that his fly presentation is appropriate. (Generally, fishermen will discover they need to go to smaller flies.) However, even then the fishing conditions will most likely change throughout the course of the day and/or as the fisherman moves from one location to another. Consequently, some fishermen will tie several flies ahead of time. However, this will rather limit the combinations available and furthermore require that a bulky container be carried with the flies and their associated tippets therein. Some fishermen have taken to carrying tippet material curled up in a spool, plastic bag, or the like. However, this presents several problems, one of which is difficulty in selecting an individual tippet from the plurality of rolled up tippets. Furthermore, due to the fact that the tippet material is carried in a curled position, it must be uncurled prior to using. Not only is this time consuming and a source of much irritation, but the uncurling process can create heat and scarring which weakens the tippet material. Furthermore, the container which holds the tippet material creates pocket bulk and competes for scarce pocket space. The use of the containers frequently requires both hands which is often awkward when in the middle of the stream or the like. Additionally, the containers or spools of tippet material are susceptible to being dropped into the stream.

Furthermore, current tippet carrying apparatus do not provide a method for readily identifying the size of the tippet material. As a result the fisherman must carry a measuring device such as a micrometer to determine the size of the tippet material. Most fishermen will not take the time to do this and will guess at the size of the tippet material thereby reducing their fishing success. Of course, multiple packages each carrying a different size of tippet material and so marked on the package could be carried, but this only aggravates the pocket bulk problem and the competition for scarce pocket space. Also, if the tippet material is carried as a continuous strand on a spool, the fisherman must guess at the length of the tippet and then use a scissors, knife, or the like to cut the material.

The present invention solves these and many other problems associated with the prior art.

SUMMARY OF THE INVENTION

The present invention relates to a tippet tube and method for carrying tippet material. The invention includes a relatively transparent, flexible hollow tube with a plurality of strands of elongated tippet material having a variety of diameters positioned within said tube, the tippet material extending beyond one end of the tube and each of said strands of tippet material being color coded to enable identification of tippet material diameter. The hollow tube further includes means located proximate a first end of said tube for retaining said tippet material in said tube and further includes means located proximate said first end for attaching the tube to an object such as an item of one's wearing apparel.

Additionally, the present invention relates to a method for carrying elongated strands of tippet material having a variety of diameters. The method includes the step of positioning a plurality of strands of elongated tippet material, having a variety of diameters, within a flexible, relatively transparent hollow tube, the tippet material being color coded for identifying the various diameters of tippet material and extending beyond one end of the tube to provide for easy access to each of the individual tippet strands. The method further includes the step of retaining the tippet material in the tube proximate a first end of the tube and attaching the tube proximate said first end to an object such as an item of one's wearing apparel.

In one embodiment of the present invention, a cylindrical plug is inserted into the tube at the first end such that the tension created thereby retains the tippet materials as they are drawn from the tube one at a time. The plugs might be color coded to indicate the particular combination and quantity of tippet material in the tippet tube. In yet another embodiment of the present invention, the tube is folded over at the first end and securedly fastened in this configuration so as to hold tight the individual strands.

In one embodiment of the present invention, a hole may be drilled either through the tube and the plug or above the tube through the plug, through which an elastic or rubber cord and/or snap can be secured so as to serve as a method for attaching the tippet tube to an item of wearing apparel such as the neck net ring of a fishing vest, or waders. The tippet tube is preferably sufficiently flexible and configured to allow positioning of the tippet tube under one's vest or other garment without causing any discomfort. Furthermore, the tippet tube is of sufficient length to extend below the vest for accessibility. Also, the tippet tube may be worn on either the right or left side of one's vest.

In the embodiment wherein the tube is folded over at the first end, a cord, preferably rubber or elastic, may be inserted through the loop formed thereby and a snap attached to the cord for attaching the tippet tube to one's wearing apparel.

In yet another embodiment of the present invention a color code guide is imprinted on the tippet tube to enable the user to identify the diameter of the tippet and the recommended hook size for that sized tippet. The color guide index feature provides guidance for proper tippet/hook match up enabling consistently the best possible presentation of the fly. In one preferred embodiment, the guide will include illustrations of actual sized hooks, thereby enabling a fisherman to simply position a hook adjacent the guide to determine the hook size.

In yet other embodiments of the present invention the tippet tube itself might be colored or suitably coded and contain tippets of the same diameter.

The present invention is particularly advantageous in that it is very convenient for the fisherman to use and yet out of the way.

Furthermore, the present invention provides for much quicker accessibility in selecting the proper size tippet. The color coded tippet material clearly identifies the size of the tippet thereby eliminating much of the guesswork in selection of a particular sized tippet. The present invention does away with the need to uncurl the tippet material as it is maintained in a relatively straight condition. Not only does this facilitate use of the tippets but it reduces the likelihood that the tippets will be weakened due to heating or scarring which can occur during uncurling.

Additionally, the fisherman's hands are more free than when having to hold a spool or cannister, cutting off a length of tippet material from the roll, and then returning the material back to one's pocket. Accidental dropping of spools or cannisters is done away with. Furthermore, pocket bulk associated with spools or cannisters is eliminated. Also, the competition for limited pocket space is reduced.

The present invention will increase the amount of "fly-time-on-the-water" and will reduce the amount of error by providing ready identification of the varying-sized tippets. Accordingly, the fisherman will have more consistent and proper terminal tackle match up for his best possible presentation and thereby recognize improved fishing results.

Additionally, the color coded tippets will help a person remember the size of tippet material which was used on the previous outing by simply observing the color of the previously used tippet.

The present invention also serves as an educational device for both the novice and occasional fly fisherman. Too often these people are concerned only with the fly being used. The present invention will assist in educating them as to the size of tippet and fly which should also be used.

These and various other advantages and features of novelty which characterize the invention are pointed out with particularity in the claims annexed hereto and forming a part hereof. However, for a better understanding of the invention, its advantages, and objects attained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF A PREFERRED EMBODIMENT

Figure 1:
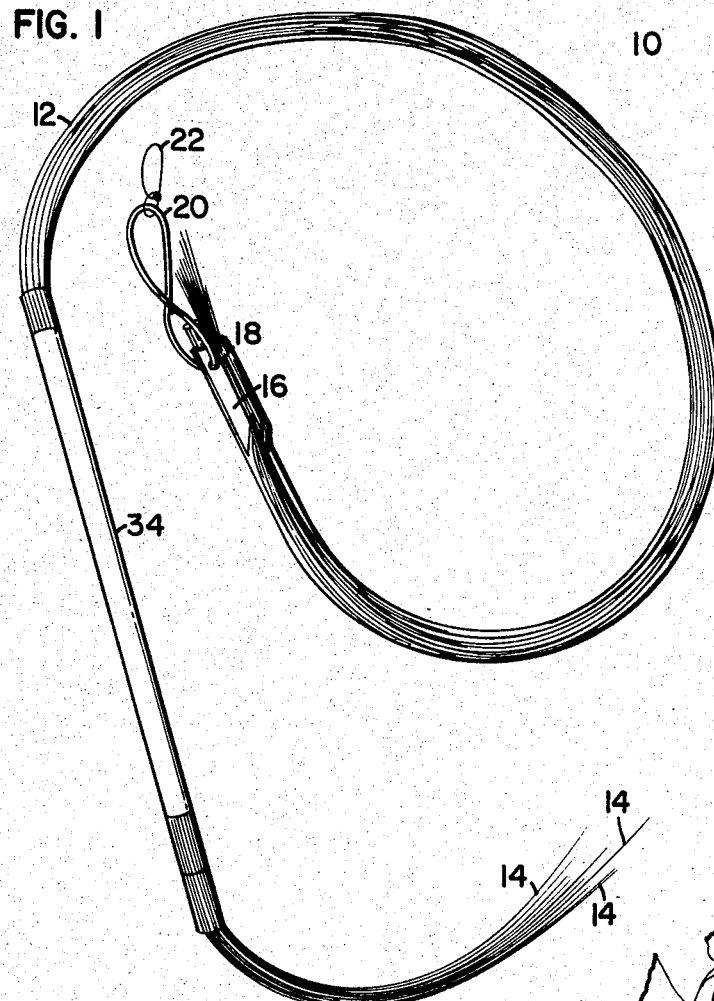
FIG. 1 is a view in perspective of a preferred embodiment of the present invention.

Illustrated in FIG. 1 is a preferred embodiment of the present invention generally being referenced by the reference numeral 10. As illustrated, the preferred embodiment of the present invention includes a relatively transparent, flexible, somewhat elastic hollow tube 12. Positioned inside the tube and extending beyond one end of the tube 12 are a plurality of strands of elongated tippet material 14, having a variety of diameters. Although not shown, the strands of tippet material 14 are color coded, each of the strands of a given diameter having the same color, with strands of different diameters having different colors, to provide for ready identification of the material diameter when selecting an individual one of the strands of tippet material 14. For example, there may be eight different diameters of the tippet material 14 positioned within the tube 12 ranging from 0.010 inches to 0.004 inches in diameter. Accordingly, there will in this example be eight different colors identifying each of these diameters. The tippet material 14 preferably extends beyond the bottom end of the tube 12 from less than one inch to six inches or more and more preferably four to six inches, to facilitate selecting and plucking out one strand at a time. It will be appreciated that the number of strands of tippet material in a tube may vary, with a quantity of forty to one hundred not uncommon. Furthermore, the diameter of the tippet tube may also vary, with a typical inside diameter range being from one-quarter to one-eighth inch depending on the quantity and size of the tippet material.

Figure 4:
FIG. 4 is an illustration of one embodiment of the present invention attached to the garment of a fisherman.

Inserted a predetermined distance into a first end of the tube 12 is a cylindrical plug 16 which serves to stretch the somewhat elastic tube 12 so as to retain the individual strands of tippet material 14 in the tube 12 by forcing the tippet material 14 against the inside walls of the tube 12. Furthermore, as illustrated, the plug 16 includes an aperture 18 through which an elastic cord 20 is inserted so as to form a closed loop. Attached to the cord 20, is a snap 22 for attaching the tippet tube 12 to one's wearing apparel such as a neck net ring 24 of a fishing vest or to any other part of a vest or garment 26 or any other portion of one's wearing apparel, including one's waders, as generally illustrated in FIG. 4. The cylindrical plug 16 might be tapered at one end for ease of insertion and color coded to indicate the particular combination and quantity of tippet material contained in the tube 12.

Figure 2:
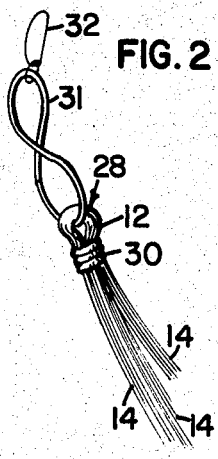
FIG. 2 is a fragmentary view in perspective of an alternate embodiment of the present invention.

Illustrated in FIG. 2, is an alternative embodiment of a structure for securing the tippet material 14 in the tippet tube 12. As illustrated, the tippet tube 12 is folded over at one end so as to form a loop-like portion 28. The tube 12 is retained in the folded over configuration by a suitable wrapping 30. Accordingly, a cord 31 may then be placed through the loop 28 and a snap 32 attached thereto.

Figure 3:
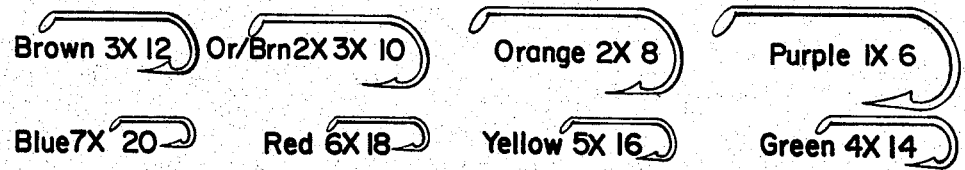
FIG. 3 is a diagrammatic view of a color guide which appears on one embodiment of the present invention.

Additionally, as illustrated in FIG. 1 and as diagrammatically shown in FIG. 3, the preferred embodiment of the present invention includes a color reference chart 34 on the tube 12 which cross references the color of the tippet material to the size of the fly hook which is best suited to that size of tippet. For example, as illustrated in FIG. 3, the color green is a 4× sized tippet and the best hook match up for that sized tippet is a number 12. Furthermore, as illustrated, the color reference chart 34 of the preferred embodiment will include an illustration of an actual sized hook adjacent its corresponding numeric size. Accordingly, a fisherman need only visually compare his hook to the illustration on the chart to determine if it is the correct size. However, it will be appreciated that on varying occasions a slightly smaller hook size may be utilized, such as when using a heavily hackled fly, or a slightly larger hook size in the case of a lightly hackled small bodied fly.

The present invention thus provides for a variety of diameters of the tippet material to be contained in a single tube, with each diameter being a different color to provide for size identification of the individual tippets. The tippet material is readily available and does not require uncurling thereof as it is in a relatively straight configuration ready for use.

It will be appreciated that the tube 12 can be of varying lengths, generally ranging from as short as six inches to as long as forty-four inches, and more generally ranging within twenty-two to twenty-eight inches. The tube 12 can be of varying inside diameter to accommodate varying quantities of the tippet material 14, with the tube 12 having a degree of elasticity or stretch such that when plugged by the cylindrical plug 16 the tension created thereby will retain the balance of the tippet material 14 in the tube 12 as the individual strands are withdrawn from the tube. Furthermore, the tube 12 can be bent double and fastened in a secured fashion so as to hold tight the individual strands. The cylindrical plugs 16 might be of different colors to indicate various content makeups or assortments of the tippet material.

Additionally, the tube 12 while being made of a clear material in the preferred embodiment, might also be made of an opaque material of a specific color or have markings thereon to identify a particular sized (coded or uncoded) tippet material being contained therein. Accordingly, the fisherman would then carry a plurality of the colored tubes 12 when fishing. Each colored tube would contain tippet material of a single diameter with different colored tubes containing different diameter tippet material.

Preferably, the tube 12 will be made from a plastic material and be sufficiently flexible to comfortably wear under one's vest or to coil up and keep in one's pocket. However, the tube 12 preferably will have sufficient memory so as to tend to return to the relatively straight position when hanging on the user's body.

Figure 5:
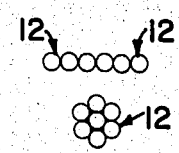
FIG. 5 is a diagrammatic view illustrating multiple tippet tube configurations.

It will be appreciated that a multiple of tube arrangements can be made up with each particular tube carrying a different sized tippet material. Illustrated in FIG. 5 are two possible multiple tube arrangements. In one arrangement, the tubes 12 are arranged linearly in a line while in the other arrangement shown, the tubes 12 are arranged in a cluster. It will be appreciated that the tubes within a group could also be carrying tippets of varying lengths.

Figure 6:
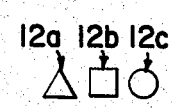
FIG. 6 is a diagrammatic view illustrating tippet tubes of different cross-sectional configuration.

In yet another embodiment of the present invention, the tubes 12 may have various cross sectional configurations as generally illustrated in FIG. 6.

It is to be understood that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. An apparatus for carrying tippet material, comprising:
    (a) a relatively, flexible hollow tube, a plurality of elongated strands of said tippet material, having a variety of diameters, positioned within said tube, each of said strands of tippet material being color coded to identify individual strands of said tippet material of a particular diameter, said strands of tippet material extending beyond a second end of said tube;
    (b) means located proximate a first end of said flexible hollow tube for forcing the tippet material against an inside wall of the flexible hollow tube proximate the first end of the flexible hollow tube so as to frictionally retain said tippet material in said tube; and
    (c) means located proximate said first end for attaching said tube to an object such as an item of one's wearing apparel.

2. An apparatus in accordance with claim 1, wherein said retaining means includes a cylindrical member inserted at least partially into said tube at said first end, said tippet material proximate said first end being compressed between said cylindrical member and the inside wall of said tube, said tube being somewhat elastic to enable expansion thereof for insertion of said cylindrical member.

3. An apparatus in accordance with claim 1, wherein said retaining means includes a loop at said first end formed by bending said tube at said first end so as to double said tube over on itself.

4. An apparatus in accordance with claim 1, wherein said tube includes a color reference chart indicating the recommended hook size to be utilized with each diameter of said tippet material.

5. An apparatus in accordance with claim 1, wherein said cylindrical member includes an aperture therethrough, an elastic cord being inserted through said aperture to form a closed loop providing for attachment of said tube to one's wearing apparel.

6. An apparatus in accordance with claim 1, wherein a plurality of said tubes are interconnected, each of said tubes including a different length tippet.

7. An apparatus for carrying tippets, comprising:
 (a) a flexible hollow tube;
 (b) a plurality of elongated strands of tippet material having a uniform diameter positioned within said tube, said tube bearing suitable indicia identifying the diameter of said tippet material;
 (c) means located proximate a first end of said flexible hollow tube for forcing the tippet material against an inside wall of the flexible hollow tube proximate the first end of the flexible hollow tube so as to frictionally retain said tippet material in said tube; and
 (d) means located proximate said first end for attaching said tube to an object such as an item of one's wearing apparel.

8. An apparatus in accordance with claim 7, wherein a plurality of said tubes are interconnected to one another, each of said tubes being of a different color and containing different diameter tippet material, the tippet material within a single one of said tubes being of the same diameter.

9. An apparatus in accordance with claim 7, wherein a plurality of said tubes are suitably interconnected, each of said tubes containing a different length of tippet.

10. A method for carrying elongated strands of tippet material, having a variety of diameters, comprising the steps of:
 (a) positioning a plurality of strands of elongated tippet material, having a variety of diameters, within a flexible, hollow tube, said strands of tippet material extending beyond a second end of said tube, said tippet material being color coded for identifying the various dimensions of tippet material;
 (b) retaining the tippet material in the tube proximate a first end of said tube by forcing the tippet material against an inside wall of the flexible hollow tube proximate the first end of the flexible hollow tube so as to frictionally retain the tippet material; and
 (c) interconnecting said tube proximate said first end to an object such as an item of one's wearing apparel.

11. An apparatus in accordance with claim 1, wherein said means for attaching said tube to an object such an item of one's wearing apparel includes snap means.

12. An apparatus in accordance with claim 7, wherein said means for attaching said tube to an object such as an item of one's wearing apparel includes snap means.

* * * * *

UNITED STATES PATENT AND TRADEMARK OFFICE
CERTIFICATE OF CORRECTION

PATENT NO. : 4,528,772

DATED : July 16, 1985

INVENTOR(S) : E. J. Schaefers

It is certified that error appears in the above-identified patent and that said Letters Patent is hereby corrected as shown below:

Col. 7, line 9, delete "claim 1" and insert --claim 2--.

Col. 5, line 38, delete "12" and insert --14--.

Signed and Sealed this

Fourteenth Day of October, 1986

[SEAL]

*Attest:*

DONALD J. QUIGG

*Attesting Officer*      *Commissioner of Patents and Trademarks*